United States Patent

Hoffa

Patent Number: 5,453,183
Date of Patent: Sep. 26, 1995

[54] FLUIDIZED BED BIOLOGICAL FILTER SYSTEM FOR FISH TANKS

[76] Inventor: Gary Hoffa, 7545 University Ave., La Mesa, Calif. 91941

[21] Appl. No.: 283,265

[22] Filed: Jul. 29, 1994

[51] Int. Cl.$^6$ .............................. A01K 63/04; C02F 3/10
[52] U.S. Cl. ..................... 210/169; 210/150; 210/264; 210/285; 210/416.2
[58] Field of Search ...................... 210/169, 416.2, 210/264, 285, 617, 661, 807, 150

[56] References Cited

U.S. PATENT DOCUMENTS

| | | | |
|---|---|---|---|
| 1,192,569 | 2/1922 | Crosby | 210/538 |
| 1,407,936 | 7/1916 | Schilling | 210/538 |
| 3,892,663 | 7/1975 | Wiedenmann | 210/169 |
| 4,043,936 | 8/1977 | Francis et al. | 210/617 |
| 4,861,472 | 8/1989 | Weis | 210/285 |
| 5,096,814 | 3/1992 | Alvasidis et al. | 435/41 |
| 5,172,650 | 12/1992 | Hsu et al. | 210/169 |
| 5,306,421 | 4/1994 | Weinstein | 210/169 |

FOREIGN PATENT DOCUMENTS

| | | | |
|---|---|---|---|
| 0155669 | 3/1985 | European Pat. Off. . | |
| 1511219 | 9/1989 | U.S.S.R. | 210/285 |

*Primary Examiner*—Peter A. Hruskoci
*Assistant Examiner*—Theodore M. Green
*Attorney, Agent, or Firm*—Charles C. Logan, II

[57] ABSTRACT

A fluidized bed biological filter system for fish tanks having a primary container structure for receiving particulate material and a secondary container structure for receiving contaminated water from a fish tank. The front and rear walls of the primary container structure converge downwardly toward each other to form an acute angle. The rear wall of the primary container structure incorporates a manifold having an inlet port at its top end and an outlet port adjacent the bottom of the primary container structure. The outlet end of the manifold is linear in shape and extends between the laterally spaced side walls of the primary container structure. Particulate material having a specific gravity greater than water is placed in the bottom of the primary container structure. The contaminated water from a fish tank is first pumped into the secondary container structure and a pump therein pumps the contaminated water into the inlet port of the manifold. The contaminated water travels downwardly through the manifold and exits the outlet port causing the particulate material to be driven upwardly in the primary container structure and it remains in a constant state of suspension as long as the pump is operating. The contaminated water passing through the particulate media functions to convert the primary metabolite of fish into the less toxic form of nitrogen and the filtered water is returned to the fish tank.

10 Claims, 2 Drawing Sheets

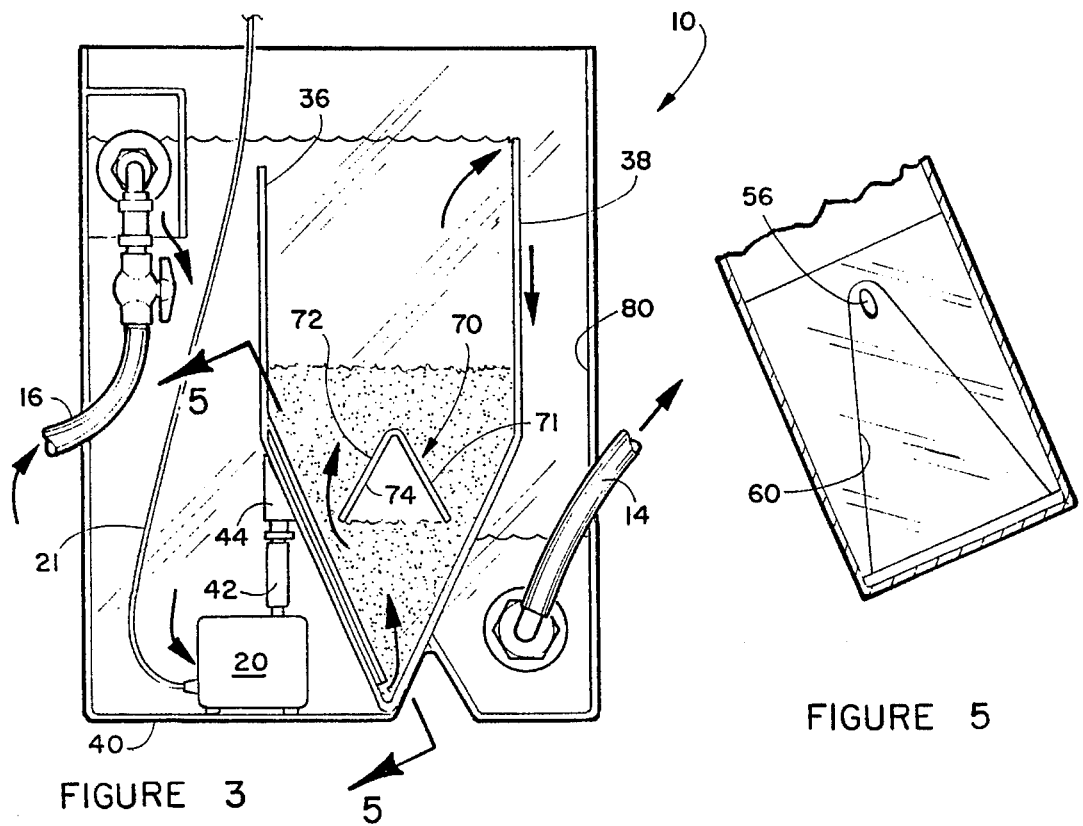
FIGURE 3
FIGURE 5
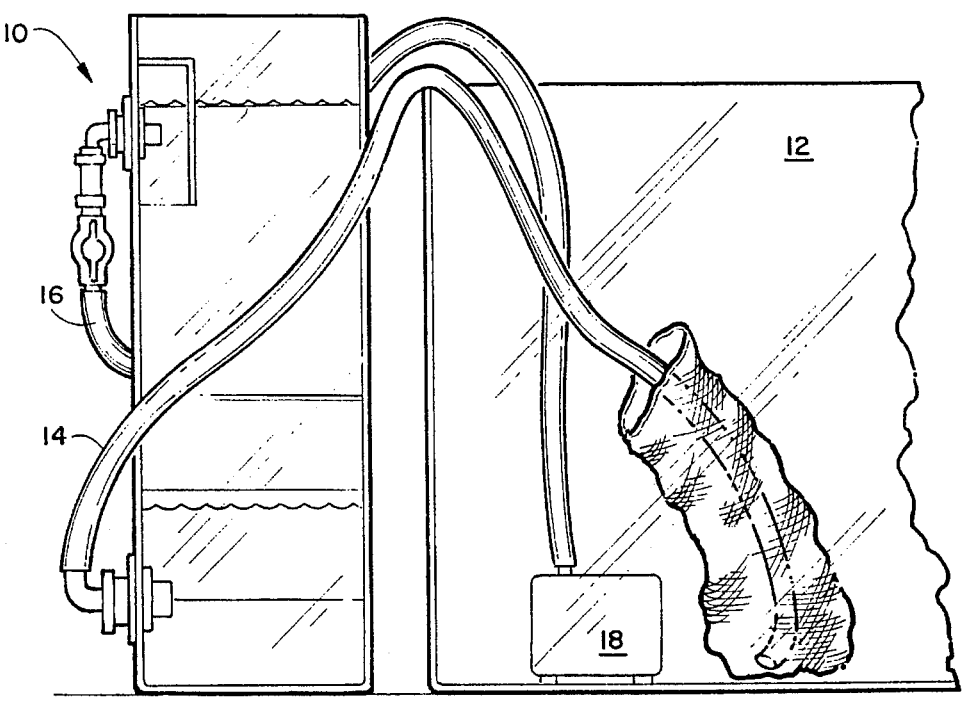
FIGURE 2

FLUIDIZED BED BIOLOGICAL FILTER SYSTEM FOR FISH TANKS

BACKGROUND OF THE INVENTION

The invention relates to a filtering system and more specifically to a fluidized bed biological filter system for fish tanks.

In recent years more adults and children have gotten into the hobby of having pet fish and raising pet fish. Additionally, fish tanks or aquariums are found in many restaurants and offices. One problem they all have in common is the need to dispose of the fish waste products.

Presently most aquarium's have a separate filtration tank into which the contaminated water is pumped for processing. A major drawback of the present system resides in the fact these filtration tanks are usually between 20 to 50 percent of the size of the fish tank with which it is used. Often times this filtration tank is placed in close proximity to the aquarium tank but preferably out of sight.

Another problem exists in fish tanks which use gravel in their bottom. The water that is pumped through this gravel has a tendency to channel wherever it is easiest to travel. Therefore you have bacteria that is healthy in areas where the water is moving. In the areas the water is not moving, bad bacteria, anaerobic bacteria form pockets of gases. If a person stirs up a pocket of gravel that has not been stirred for three or four months, it will kill all of the fish in a tank.

Another problem with the use of gravel is each piece of gravel has only so much surface area to which the bacteria can attach itself. By using smaller gravel it is possible to obtain more surface area for the bacteria but it cuts down on the space between the respective pieces of gravel and sometimes it compacts into a solid layer.

It is an object of the invention to provide a novel fluidized bed biological filter system that eliminates the need for gravel in the bottom of the fish tank.

It is another object of the invention to provide a novel fluidized bed biological filter system that drastically reduces the size of the tank required for filtering the contaminated water of a fish aquarium.

It is also an object of the invention to provide a novel fluidized bed biological filter system that utilizes a particulate material whose size is in the range of 50 to 300 microns thereby providing an enormous amount of surface area for the bacteria to contact as opposed to the amount of surface area on conventional gravel used in the fish tanks.

SUMMARY OF THE INVENTION

The novel fluidized bed biological filtering system has a primary container structure for receiving particulate material and a secondary container structure for receiving contaminated water from a fish tank. The system is designed to be a more efficient process for converting the primary metabolite of fish (ammonia) into the less toxic form of nitrogen (nitrate). In their preferred forms these two containers would be integrally formed so that the rear wall of the primary container structure would also constitute the front wall of the secondary container structure. This common wall also functions as a dam whose height is not as high as the lateral side walls of the integrated structure. Therefore water from the primary container structure can flow over into the secondary container structure in the event that the pump carrying contaminated water from the fish tank becomes inoperable. This insures that the pump in the bottom of the secondary container will never run dry.

The configuration of the primary container structure is such that it has a front wall, a rear wall, and laterally spaced side walls. The bottom ends of the front and rear walls converge toward each other at an acute angle to form a V-shaped cross section where they intersect at their bottom ends. The sloping portion of the rear wall of the primary container structure is preferably formed of three layers. The rear or exterior layer has an aperture adjacent its top end. This aperture would be in communication with the outlet port of a one-way valve. The inlet port of the one-way valve would be connected by tubing to a pump positioned in the bottom of the secondary container structure. The second layer of the rear wall of the primary container structure would have an aperture aligned with the aperture in the rear layer. The interior of the second or intermediate layer would be routed out in a triangular shape that starts narrowly at its top and extends to its lateral edges adjacent its bottom end. The third or interior layer covers the intermediate layer and the assembled structure functions as a manifold having an outlet port in its bottom end that is linear in shape and extends substantially across the width of the primary container structure.

A baffle is located in the interior of the primary container structure and it is positioned at a predetermined height directly above the bottom of the primary container structure. The baffle has the cross sectional shape of an inverted V and it has its opposite ends attached to the respective lateral side walls of the primary container structure. The underside of the baffle forms a chamber whose function will be described later.

In operation, a hose would have its one end connected to a pump in the fish tank. The other end of the hose would be connected to an inlet port adjacent the top end of the secondary container structure. The pump would transmit the contaminated water from the fish tank to the secondary container structure. A predetermined amount of particulate media would be poured into the primary container structure filling it approximately its midpoint which would be above the baffle. The particulate media is preferably glass beads having a specific gravity greater than 1.5 times that of water. These glass beads would have a diameter between 50 and 300 microns and they would be essentially spherical. The use of glass beads, a fine and delicate abrasive substance normally used in sandblasting, is a new use for the material. The advantage for this application is that glass beads are uniformly spherical and softer than silica, therefore it is less abrasive than granular materials that are prepared by various forms of crushing devices. This results in less damage to the enclosing chamber than silica. Also, because it is a man-made material, uniformity of particle size is more consistent and this results in more predictable flow characteristics when mixed in a fluid and hydraulic force is applied. When the pump is not running the particulate media settles down to the bottom of the primary container structure. When the pump is shut-off the material even rises up into the triangularly shaped manifold and is prevented from traveling into the pump by the one-way valve.

When the pump in the secondary container structure is actuated, the contaminated water will be pumped into the inlet port of the manifold and the water will quickly drive the particulate material downwardly until all of it exits the manifold and provides a turbulent force for driving the particulate in the primary container structure into a suspended state in the water. A particulate-free water pocket chamber beneath the baffle provides two functions. First the baffle forming the particular-free water pocket chamber prevents the upwardly churning particulate from breaking the water surface in the primary container structure and it also provides a pocket into which the rising particulate can be directed when the pump is initially started.

The glass bead media is very clean in its bulk state out of a bag and it does not produce a milkiness of the water. As the water is pumped in at a controlled rate, it lifts the glass beads and keeps them suspended in the water. If a person were to stick their hand into the primary container structure when the pump is operating, they could hardly feel the individual particles. It would merely feel like water. The particles are in a liquid state and are not gathered together at all. They are not bridged together and they are not laying anywhere in the primary container in a mass since they are 100% lifted from the bottom of the primary container structure. Any glass beads that may get into the pump do not damage it. The suspended glass beads allow the bacteria to cling to them extremely well over their entire spherical surface. The action of the water passing upwardly through the glass beads decontaminates the water and as the amount of water in the primary container structure rises to its top, the front wall of the primary container structure functions as a dam and also as the rear wall of a re-oxygenation chamber unit. The decontaminated water rises over the top of the front wall and dribbles down its face into the bottom of the re-oxygenation container allowing the water to be revitalized with fresh oxygen. A hose is connected to the bottom of this chamber and returns the revitalized water to the fish tank.

DESCRIPTION OF THE DRAWINGS

FIG. 2 is a schematic end elevation view of the novel fluidized bed biological filter system connected to an aquarium;

FIG. 3 is a schematic side elevation view of the filtration tank assembly;

FIG. 5 is an enlarged cross sectional view of the manifold assembly taken along lines 5—5 of FIG. 3;

FIG. 7 is a schematic elevation view showing the particulate matter settled in the bottom of the primary tank prior to the pump being turned on.

DESCRIPTION OF THE PREFERRED EMBODIMENT

Figure 1:
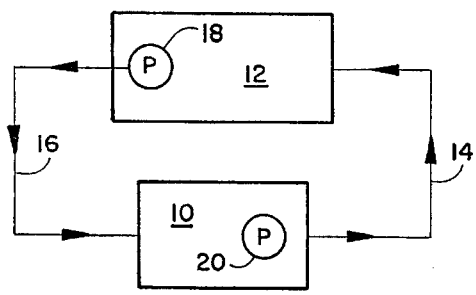
FIG. 1 is a schematic illustration of the novel fluidized bed biological filter system connected to an aquarium.

The novel fluidized bed biological filter system for fish tanks will now be described by referring to FIGS. 1–7 of the drawings. In FIG. 1 the filtration tank assembly 10 is connected to aquarium 12 by hoses 14 and 16. An electric pump 18 pumps the contaminated water of the aquarium through hose 16 to filtration housing 10. Once hose 14 has been primed the water will return to aquarium 12 without the need for it to be pumped.

The filtration tank assembly 10 has a secondary tank 24, a primary tank 26 and a third tank 28. Side walls 30 and 31 are common to the respective tanks. Filtration tank assembly 10 also has a rear wall 33 and a front wall 34. Wall 36 is a common wall between secondary tank 24 and primary tank 26. Wall 38 is a common wall between primary tank 26 and third tank 28. Filtration tank assembly 10 also has a bottom wall 40 that is common to the respective tanks.

Secondary tank 24 has an electrically powered pump 20 having an electrical cord 21, positioned on bottom wall 40. Contaminated water from aquarium 12 flows into pump chamber 25 of secondary tank 24 and is drawn through water pump 20, hose 42, one-way valve 44 and aperture 46 in the lower portion of rear wall 36. Aperture 46 is at a predetermined height H1 above bottom wall 40.

Figure 6:
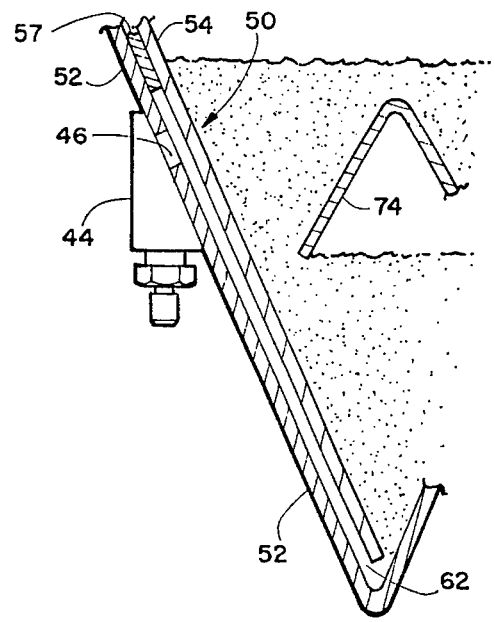
FIG. 6 is an enlarged cross sectional view of the manifold assembly.

The lower portion of rear wall 36 includes a manifold assembly 50 (see FIGS. 5 and 6). It is formed of a rear panel layer 52, an intermediate panel layer 57 and a front panel layer 54. Intermediate panel layer 53 has an aperture 56 adjacent its top end that aligns with aperture 46 in rear panel layer 52. Starting from aperture 56, intermediate panel layer 53 is routed to form a triangular cutout portion 60 that extends down to its bottom edge and also to the side walls 30 and 31 of primary tank 26. The lower portion 37 of common wall 36 and the lower portion 39 common wall 38 intersect each at an acute angle A.

Figure 7:
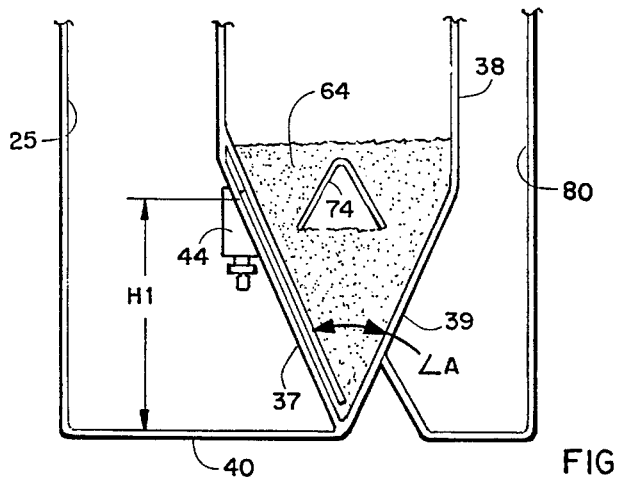
Figure 4:
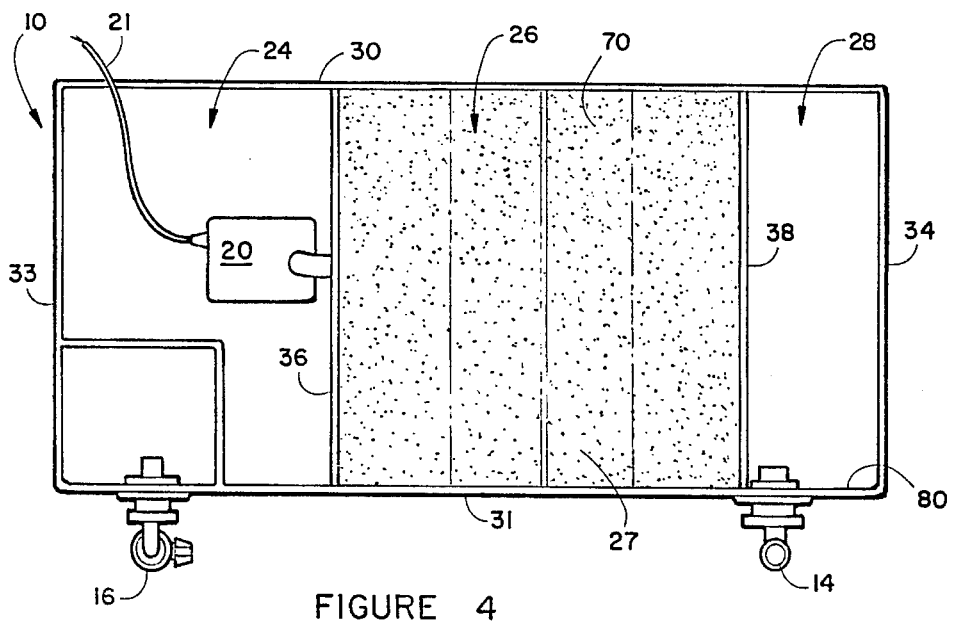
FIG. 4 is a schematic top plan view of the filtration tank assembly.

Water that has been pumped through manifold assembly 50 exits through outlet port 62 and drives the particulate media 64 that is in the particulate media chamber 27 of primary tank 26 upwardly into fluid suspension within the water. A baffle 70 is positioned a predetermined height above the bottom surface of primary tank 26 and it prevents the particulate media from bubbling up to and through to the top surface of the water and passing out of the primary tank. Baffle 70 has a front panel 7 and a rear panel 72 that extend across the entire width of primary tank 26. When pump 20 is turned off, a particulate-free chamber 74 is formed beneath baffle 70 as the particulate material 64 drains downwardly. The particulate material 64 also passes up into the interior of manifold assembly 50. One-way valve 44 prevents the particulate material from traveling back into the water pump 20. FIG. 6 is an enlarged cross sectional view of the manifold assembly. FIG. 7 is a schematic illustration showing the particulate matter prior to pump 20 being turned on.

Common wall 36 is not as high as the side walls 30 and 31 and functions as a dam wall which allows water to pass over it and back into the pump chamber 25 in case pump 18 stops functioning. Common wall 38 is also of a height less than side walls 30 and 31 and it also functions as a dam wall. The filtered water as it passes over wall 38 dribbles down its front surface into the re-oxygenation chamber 80 of third tank 28. This water then travels through hose 14 back to aquarium 12.

What is claimed is:

1. A fluidized bed biological filtration tank assembly for use with fish tanks, said filtration tank assembly comprising:

a primary container structure for receiving particulate material, said primary container having a top end, a front wall having a lower portion, a rear wall having a lower portion, the lower portions of said front and rear walls converge downwardly toward each other and form a bottom wall where they intersect, an acute angle A is formed between said respective lower portions; a pair of laterally spaced side walls that surround a particulate chamber;

a preselected volume of particulate material placed in said primary container structure said particulate material having a specific gravity greater than 1.5 and having a size in the range of 50–300 microns;

the lower portion of said rear wall includes a manifold assembly having a top end, a bottom end, an inlet port and an outlet port; said outlet port is positioned adjacent the intersection of the lower portions of said respective front and rear walls; said outlet port being substantially equal to the width of said primary container structure between said laterally spaced side walls to give said water outlet port a substantially linear shape; passageway means connecting said inlet port to said outlet port;

a secondary container structure for receiving contaminated water from a fish tank, said secondary container structure having a top end, a bottom end and a plurality of side walls that surround a pump chamber; and means for pumping contaminated water from said secondary container structure into the inlet port of the manifold assembly of said primary container structure.

2. A fluidized bed biological filtration assembly as recited in claim 1 wherein the rear wall of said primary container structure is a common wall to said secondary container structure and it forms the front wall of the secondary container structure.

3. A fluidized bed biological filtration assembly as recited in claim 1 wherein said particulate material is in the form of glass beads used in sandblasting operations.

4. A fluidized bed biological filtration assembly as recited in claim 1 wherein said means for pumping contaminated water from said secondary container structure into the inlet port of the manifold assembly of said primary container structure comprises:

a pump positioned in said secondary container structure; and means connecting said pump to said water inlet port of said manifold assembly.

5. A fluidized bed biological filtration assembly as recited in claim 4 wherein said means connecting said pump to said inlet port of said manifold assembly comprises:

a tube having an inlet end and an outlet end and said inlet end is connected to said pump;

a one-way valve having an inlet end and an outlet end and said inlet end is connected to the outlet end of said tube;

an inlet port in the rear wall of said primary container structure at a preselected height H1 above said bottom wall;

the outlet end of said one-way valve being connected to the inlet port which in turn is connected to the inlet port of said manifold assembly.

6. A fluidized bed biological filtration assembly as recited in claim 1 wherein said passageway means is a substantially triangularly shaped passageway that is narrow at its top end and substantially equal to the width of said primary container structure at its bottom.

7. A fluidized bed biological filtration assembly as recited in claim 1 further comprising baffle means positioned in said particulate media chamber above the water outlet port of said manifold assembly to prevent particulate material from bubbling to a water surface in said primary container structure.

8. A fluidized bed biological filtration assembly as recited in claim 7 wherein said baffle means has downwardly extending edges to form a chamber thereunder.

9. A fluidized bed biological filtration assembly as recited in claim 8 wherein said baffle means extends substantially the entire width of said primary container structure.

10. A fluidized bed biological filtration assembly as recited in claim 8 further comprising a third container structure that functions as a re-oxygenation chamber and it has a top end, a bottom end, a front wall, a rear wall and a pair of lateral spaced side walls.

\* \* \* \* \*